United States Patent

Kajihara

[11] Patent Number: 4,603,762
[45] Date of Patent: Aug. 5, 1986

[54] WHEEL CYLINDER HAVING AN AUTOMATIC CLEARANCE ADJUSTING MECHANISM

[75] Inventor: Shoji Kajihara, Fujisawa, Japan

[73] Assignee: Tokyo-Buhin Kogiyo Co., Ltd., Yamato, Japan

[21] Appl. No.: 664,814

[22] Filed: Oct. 25, 1984

[30] Foreign Application Priority Data

Dec. 28, 1983 [JP] Japan ............... 58-199453[U]
Dec. 28, 1983 [JP] Japan ............... 58-199454

[51] Int. Cl.$^4$ .................................. F16D 51/00
[52] U.S. Cl. .................. 188/79.5 R; 188/196 BA
[58] Field of Search ........ 188/196 BA, 196 A, 196 B, 188/196 C, 196 D, 196 V, 79.5 GE, 364, 79.5 R, 199, 196 R, 325, 326, 335, 340, 341, 362; 192/111 A

[56] References Cited

U.S. PATENT DOCUMENTS 3,570,632 3/1971 Williams ............... 188/79.5 R

FOREIGN PATENT DOCUMENTS 2850480 5/1979 Fed. Rep. of Germany ...... 188/196 BA

Primary Examiner—Bruce H. Stoner, Jr.
Assistant Examiner—Robert J. Oberleitner
Attorney, Agent, or Firm—Flynn, Thiel, Boutell & Tanis

[57] ABSTRACT

A wheel cylinder for drum brakes having a mechanism for automatically adjusting the excess clearance formed between the lining on each brake shoe and the inner surface of the brake drum due to the wear of the lining. Excess clearance may be produced in different amounts by the respective (two) brake shoes. The wheel cylinder of this invention has incorporated in its cylinder body a mechanism for adjusting such excess clearance caused by each of the brake shoes. There are provided guide gears designed to rotate in accordance with piston movement and clutches making ratchet engagement with the guide gears, and the excess clearance is adjusted by the axial movement of each piston corresponding to the angle of rotation made by a new ratchet engagement. Also, clamps are provided between the brake shoes for ensuring the correct amount of piston movement corresponding to the angle of rotation. The present wheel cylinder finds best application to drum brakes for vehicles.

4 Claims, 5 Drawing Figures

WHEEL CYLINDER HAVING AN AUTOMATIC CLEARANCE ADJUSTING MECHANISM

BACKGROUND OF THE INVENTION

1. Field of the Invention

This invention relates to a wheel cylinder adapted for use in a drum brake for vehicles, said wheel cylinder having a mechanism capable of automatic and proper adjustment of an excess clearance formed between the lining and the internal surface of the brake drum due to the wear of the lining.

2. Description of Prior Art

Generally, a drum brake has a pair of shoes provided symmetrical to each other on the inside of the drum, each shoe being anchored at its one end to a backing plate by a pin so that both shoes are pivotable freely relative to each other, the other end of each shoe being attached to an end of the piston in the wheel cylinder. The piston in the wheel cylinder is split into two portions so that both portions can operate independently of each other. Said piston is also so designed that when the brakes are applied, both piston portions are forced out on both sides of the wheel cylinder to let said shoes pivot about the axis of the anchor pins while pressing the lining provided as a friction material on the external surface of each shoe against the interior surface of the brake drum to produce a braking force. When the brakes are taken off, the respective shoes and piston are forced back to their original positions under an elastic force of a return spring disposed between the edge portions of the two symmetrical shoes on the inside of the brake drum. As the wear of said lining adapted as a friction material increases, the piston displacement is accordingly increased to give rise to the problem of brake delay. Accordingly, the wheel cylinder is required to have a mechanism for making automatic adjustment of the clearance between said lining and the inner surface of the brake drum.

The conventional automatic clearance adjusting mechanism is provided on the outside of the wheel cylinder and is designed to directly adjust the respective shoes by utilizing a cam mechanism or a link mechanism independently of the wheel cylinder function. In the brake drum of the type in which an automatic clearance adjusting mechanism is incorporated in the wheel cylinder, there is provided a single-acting wheel cylinder having a single piston, and such type of drum brake is mostly applied to the small-sized vehicles having a brake with only one shoe. Even in the drum brake of the type provided with a double-acting wheel cylinder having two separate pistons and two brake shoes disposed symmetrically to each other on the inside of the drum, the automatic clearance adjusting mechanism is provided in association with only one of the pistons and is designed to adjust only one of the shoes, independently of the movement of the other piston. Further, the automatic clearance adjusting mechanism constructed by using a cam mechanism or a link mechanism is complicated in its own mechanism and has the problem that it is difficult to provide such mechanism in a narrow space in the inside of the brake drum. On the other hand, in the case of the automatic clearance adjusting mechanism of the type in which only one of the pistons is adjusted, there was problem that it is difficult to make proper adjustment of clearance in correspondence to the amount of wear of each shoe lining as the linings of the respective shoes provided symmetrically on the inside of the brake drum have a different degree of wear.

OBJECT OF THE INVENTION

The first object of this invention is to provide a wheel cylinder adapted for use in a drum brake for vehicles provided with an automatic clearance adjusting mechanism, said wheel cylinder having provided therein two independently operating pistons and designed to function in a way to spread out the respective brake shoes provided symmetrically to each other on the inside of the brake drum, wherein an automatic clearance adjusting mechanism is provided for each piston so that the amount of adjustment of clearance assigned to each piston can be adjusted in correspondence to the different amounts of wear of the respective linings of the right and left shoes.

The second object of this invention is to provide a wheel cylinder adapted for use in a drum brake for vehicles provided with an automatic clearance adjusting mechanism, said wheel cylinder having provided therein two independently operating pistons and functioning in a way to spread out the brake shoes provided symmetrically to each other on the inside of the brake drum, said wheel cylinder being provided with on automatic clearance adjusting mechanism designed so that the amounts of adjustment of clearance assigned to the respective pistons can be adjusted at the same time.

The third object of this invention is to provide a wheel cylinder provided with an automatic clearance adjusting mechanism and adapted for use in a drum brake for vehicles, said wheel cylinder being provided with a clampling means whereby an outside end face of the piston or an end face of the head portion of a push bolt provided in threaded engagement with the piston is joined to the web of the shoe attached to said end face to eliminate the play in the rotating direction to thereby allow highly efficient automatic clearance adjusting function.

DETAILED DESCRIPTION OF THE INVENTION

The present invention will be described in detail below with reference to the accompanying drawings.

Figure 1:
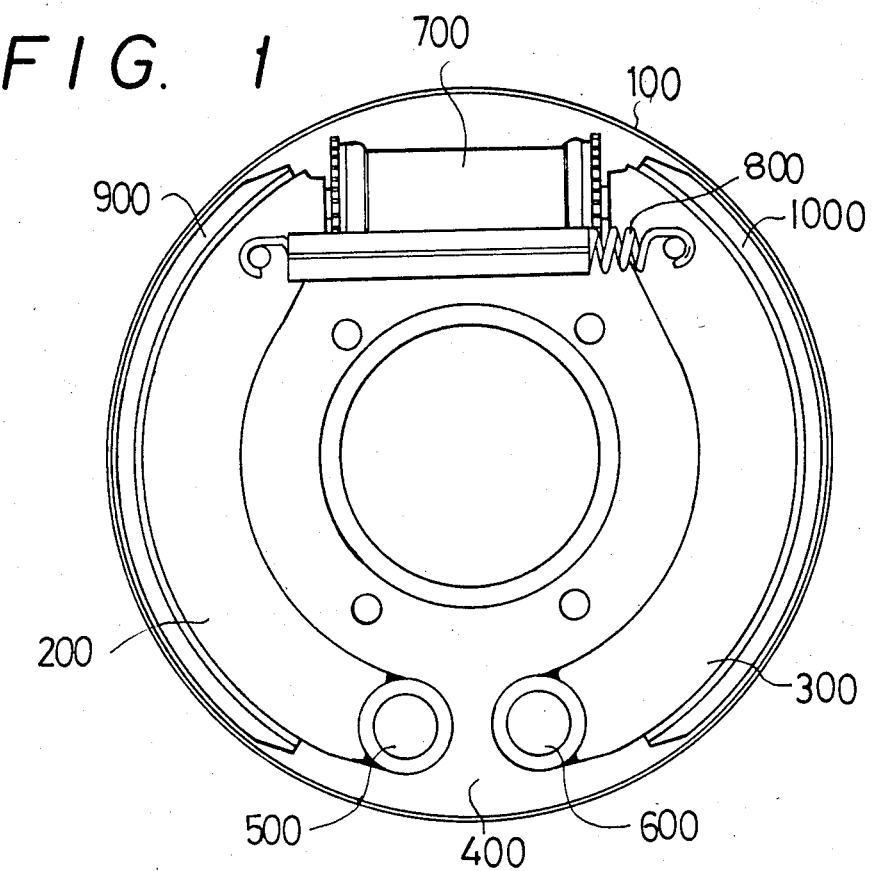
FIG. 1 is a schematic plane view of a drum brake provided with a double-acting wheel cylinder.

Referring to FIG. 1, it will be seen that a brake drum 100 is secured to a wheel so that it is rotatable integrally with said wheel. A pair of brake shoes 200 and 300 are provided symmetrically to each other on the inside of said drum 100, with an edge of each of said shoes being secured, in a slide fit manner, to a non-rotatable backing plate 400 by an anchor pin 500 (600) planted to said backing plate so as to project vertically therefrom. With such slide fit relation to said back plate, both brake shoes 200 and 300 are freely rotatable on said backing plate 400. The other ends of said shoes are provided in attachment to and in a manner to hold a wheel cylinder 700 which is designed to be operable in both direction. A return spring 800 is provided parallel to said wheel cylinder 700, with both ends of said return spring 800 being fixed to the respective shoes 200 and 300 so that said shoes are normally pulled toward each other. Each of said shoes 200, 300 is provided with a lining 900, 1000 adapted to serve as a friction material. Said linings 900 and 1000 are so designed that they are pressed against the inner surface of the brake drum 100 when the shoes 200 and 300 are turned in the outward direction about the axes of the respective pins 500 and 600 by the operation of the wheel cylinder 700 so as to exert a braking force to the rotating drum 100. When the operation of the wheel cylinder 700 is stopped and the pressure introducing circuit to the wheel cylinder 100 is depressurized, both shoes 200 and 300 are forced back to their original positions by the pulling force of the return spring 800.

Figure 2:
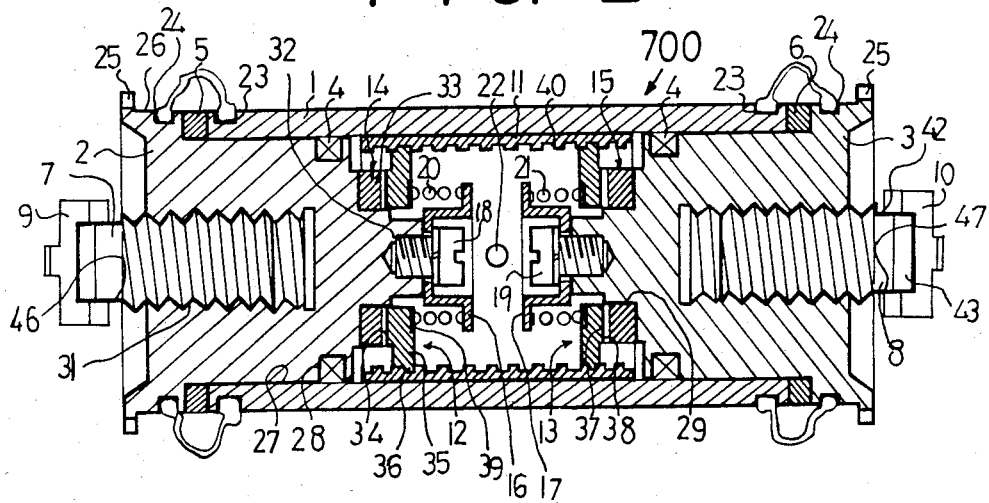
FIG. 2 is a longitudinal sectional view of a wheel cylinder provided with two automatic clearance adjusting mechanisms.

FIG. 2 is a longitudinal sectional view of the wheel cylinder 700 provided with a pair of automatic clearance adjusting mechanisms according to this invention. The cylinder body 1 has a flat and smooth inner surface and is provided with a pressure feed hole 22 extending centrally therethrough and designed to introduce a pressurized operating fluid. Said cylinder body 1 is provided with grooves 23, 24 engaged with the boot ends, said grooves being formed circumferentially in the external surface of the cylinder body close to its both open ends. A pair of pistons 2 and 3, same in configuration, are fitted into the cylinder body 1 from its both open ends in a symmetrical relation to each other. Each of said pistons 2, 3 has at its one end a portion having a greater diameter than the outer diameter of the cylinder body 1, and at this portion is provided an adjusing gear 25 having on its external surface a trapezoidal protuberance and designed to allow manual adjustment of the clearance. Contiguous to said adjusting gear 25 is formed an exposed portion 26 having a diameter smaller than the root diameter but substantially equal to the outer diameter of the cylinder bodt 1. The groove 24 is formed circumferentially along the peripheral surface of said exposed portion 26, and boots are fitted in said groove 24 and in the corresponding grooves 23 in the cylinder body 1 to thereby inhibit introduction of dust from the space between the cylinder body 1 and the pistons 2, 3. Contiguous to said exosed portion 26 is formed a slide fit portion 27 having an end face transverse to the outer peripheral surface of said exposed portion 26, said slide fit portion 27 being reduced in diameter so that it can move slidingly along the inner surface of the cylinder body 1. Toward the end and circumferentially of said slide fit portion 27 is provided an open channel 28 having a rectangular section shape, and a piston cup seal 4 is fitted in said open channel 28 to prevent leakage of the operating fluid from between the external surface of the pistons 2, 3 and the inner surface of the cylinder body 1. At a position only slightly away from said open channel 28 is provided a fitting portion 29 arranged transverse to the slide fit portion 27 and reduced in diameter, said fitting portion 29 projecting from the end face traversing said slide fit portion 27. A tapped hole 32 is formed at the center of the end face of said fitting portion 29. Also, an adjusting tapped hole 31 is provided on the side of the pistons 2, 3 where the adjusting gear 25 is provided, said adjusting tapped hole 31 opening in the center of the end face and having a length which is more than $\frac{1}{2}$ of the axial length of the pistons 2, 3. There are also provided a pair of clutches 14 and 15 which are same in configuration. Each of said clutches 14, 15 has ratchet teeth 34 provided on one of the ring faces of the ring-shaped clutch body 33, the inner diameter of the ring being slightly smaller than the outer diameter of the fitting portion 29 of each said piston 2, 3. The clutch body 33 is press fitted onto said fitting portion 29. The ring thickness of said clutch body 33 is substantiallyj equal to the axial length of said fitting portion 29.

There are further provided a pair of guide gears 12 and 13, each of which comprises a helical gear 36 formed on the external surface of the ring-shaped guide gear body 35 and a boss 37 projecting from one of the ring faces and having a diameter slightly smaller than the root diameter of said helical gear 36. At the ring-shaped end face of said boss 37 is provided a ratchet 38 meshed with the ratchet teeth 34 formed on said clutch body 33. At the ring-shaped end face on the side opposite from said boss 37 is formed a circular female face 39 having the receiving bores for the coil springs 20, 21. It is desirable that the outerdiameter of the clutch body 33 is equal to the diameter of the boss 37. The ring thickness, including the boss 37, of each said guide gears 12, 13 should be greater than the ring thickness of each said clutches 14, 15 so that no lack of strength would be caused. There is also provided a thick-walled cylindrical fixed guide gear 11 having an internal helical gear 40 formed on the inner surface along the full axial length of said cylindrical fixed guide gear 11, said internal helical gear 40 being meshed with the helical gears 36 formed on said guide gears 12, 13. This fixed guide gear 11 is press fitted into the inner surface at the central part of the cylinder body 1 so that the two portions on both sides of said central part of the cylinder body 1 will be equal in length. The axial length of said fixed guide gear 11 is so selected that the two guide gears 12 and 13 won't be disengaged from each other even when they move in the mutually separating directions while having an engaged relation. At the center of said fixed guide gear 11 is provided a through-hole in alignment with the pressure feed hole 22 provided in the cylinder body 1.

There are additionally provided a pair of spring bearings 16 and 17 of the same configuration. Each of these spring bearings is formed as a cylindrical body short in the axial length and having a flat bottom, and at the open edge of said cylindrical body is provided an integral circular flange extending in the diametrical direction. Each of said spring bearings 16, 17 has a bolt hole at the center of the bottom face, and the outside of the bottom is attached to the end face of the fitting portion 29 of each piston 2, 3. The fixing bolts 18 and 19 are screwed into the respective tapped holes 32 to fix said spring bearings in position with their open sides opposed to each other. Also, coil springs 20, 21 are disposed between the backside of the flange and the female faces of the guide gears 12, 13 to press said guide gears 12, 13 against the clutches 14, 15 in an engaged relation to each other.

Figure 4:
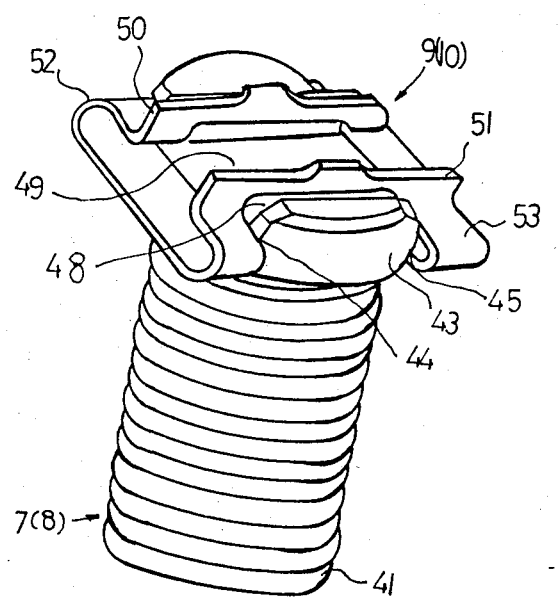
FIG. 4 is a perspective view of a clamp means in a state where it was properly fit to an end face of a push bolt in accord with the FIG. 2 embodiment.
Figure 5:
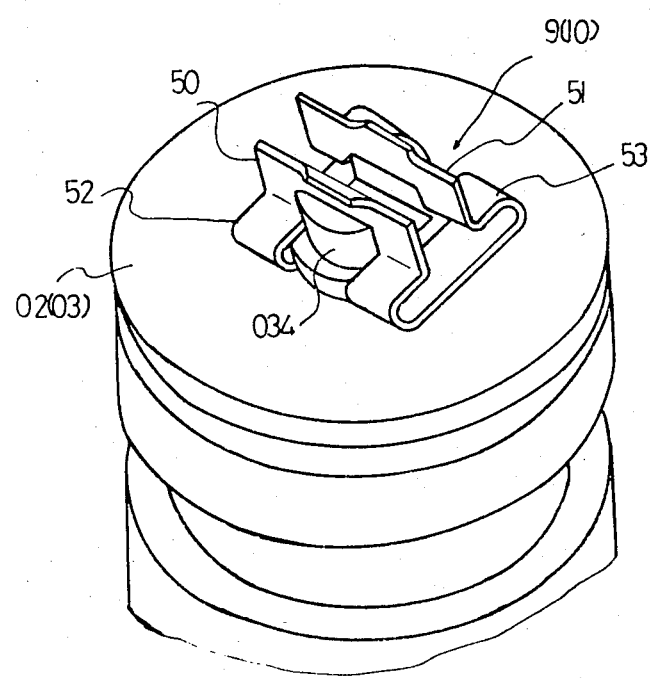
FIG. 5 is a perspective view of a clamp means fitted to the outer end of a piston, in accord with the FIG. 3 embodiment.

A pair of push bolts 7 and 8 of a same configuration are also provided. In FIG. 2 and FIG. 4, each of said push bolts 7, 8 has an outside screw-threaded portion 41 mating with the adjusting tapped hole 31 formed in each piston 2, 3. At the starting end of said outside screw-threaded portion 41 is provided a short rod-shaped portion 42 with a diameter equal to the root diameter, and the bolt head portion 43 is formed contiguous to said rod-shaped portion 42. Said bolt head portion 43 is circular in shape and its both side edges are cut out parallel to each other to form the parallel edged portions 44 and 45. The length of said parallel edged portions is so determined that they can reach the rod-shaped portion 42 and the partially parallel plane portions 46, 47 are provided at a part of said rod-shaped portion 42. Also, at the center of the end face of said bolt head portion 43 is provided a rectangular slit 48 extending transverse to the parallel edged portions 44, 45. The bottom face 49 of said rectangular slit 48 is formed convex so that said bottom face 49 is high at its center and gradually slopes down toward both parallel edged portions 44, 45.

Clamping means 9, 10 of a same configuration are also provided. As shown in FIG 4, each of said clamping means comprises a clamp body 52 (53) having two continuous curved portions formed by first curving both sides of a strip-shaped plate to have a convexity in the outward direction and then further curving the curved end of said plate to have an inward convexity so that said clamp body has elasticity in the vertical direction. Said both clamp bodies 52 and 53 are arranged parallel to each other with a determined space therebetween. Also, the curved edge of each of said clamp bodies 52, 53 is raised up vertically to form a snapping lip 50 (51), and both clamp bodies 52 and 53 are joined integral to each other by the respective snapping lips 50 and 51. Said snapping lips 50 and 51 are also designed to have elasticity. Thus, the clamping means 9 and 10 are so constructed that they have a strong spring force as a whole. It should be noted here that the space between the clamp bodies 52 and 53 is so selected that it will be slightly smaller than the distance between the parallel edged portions 44 and 45 of said push bolts 7 and 8, while the space between the snapping lips 50 and 51 is so selected that it will be smaller than the width of the rectangular slit 48 in each push bolt 7, 8 and also slightly smaller than the thickness of the web of each brake shoe 200, 300. Said clamping means 9 and 10 are adapted as follows. The clamp bodies 52 and 53 are fitted to the parallel edged portions 44 and 45 formed on the bolt head portion 43 of the respective push bolts 7 and 8 and fixed in the state where the strip-shaped plates of the respective clamp bodies 52 and 53 are attached to the stepped parts of the partially parallel plane portions 46 and 47 of the rod-shaped portions 42 of the bolts. The snapping lips 50 and 51 of the clamp bodies 52 and 53 are each positioned inside of the rectangular slit 48 in the bolt head portion 43, with the edge of each snapping lip 50 (51) projecting out slightly from the bolt head portion 43.

The ring-shaped elastic members 5 and 6, either rectangular or square in sectional shape, are made of a synthetic rubber material or a synthetic resin. These ring-shaped elastic members are so formed that the inner diameter of the ring is substantially equal to the outer diameter of the slide fit portion 27 of the piston 2 (3) while the outer diameter of the ring is substantially equal to the outer diameter of the cylinder body 1. Said elastic members 5 and 6 are fit to the slide fit portions 27 of the respective pistons 2 and 3 and disposed between both open ends of the cylinder body 1 and the stepped faces of the exposed portions 26 of the pistons 2 and 3 so as to function as a buffer at the time of returning movement of the pistons 2 and 3. Said elastic members, therefore, may be a thin plate with weak elasticity, formed into a ring-shaped belleville spring.

We will now describe the positional relations among the cylinder body 1, pistons 2 and 3, and other primary parts in the axial direction.

The pistons 2 and 3 are so arranged that when they are fitted with the elastic members 5 and 6 and inserted into the cylinder body 1, each elastic member is held by the stepped face of the exposed portion 26 and each open end of the cylinder body 1, with the teminal end face of the slide fit portion 27 not being attached to the corresponding fixed guide gear 11, and that when the spring bearings 16 and 17 are fixed in position opposing to the end faces of the fitting portions 29 of the respective pistons 2 and 3, a space is formed between the opposing faces of the flanged portions of the respective spring bearings 16 and 17 and the space between their piston cup seals 4 is always filled with the operating fluid supplied from the pressure feed hole 22. The push bolts 7 and 8 are adapted for regulating the distance between the web of each brake shoe 200, 300 and the bolt head portion 43 in the state where the wheel cylinder 700 is inoperative, and also the shoe webs are held by the clipping lips 50 and 51 of the clamping means 9 and 10 to eliminate any chance of causing looseness in the rotating direction.

The operations of the wheel cylinder and the automatic clearance adjusting mechanism will be described hereinbelow.

When a pressurized operating fluid is introduced into the cylinder body 1 from the pressure feed hole 22 for applying the brakes, the pistons 2 and 3 are forced out by the outward pressing force of the operating fluid. At the same time, due to the engagement of the internal helical gear 40 of the fixed guide gear 11 with the coresponding helical gears 36 of the guide gears 12 and 13, they receive a rotative force acting to let them rotate in the opposite directions through the clutches 14 and 15 secured to the pistons 2 and 3 and having the ratchet teeth 34 meshed with the corresponding ratchet teeth 38 of said guide gears 12 and 13. However, when the wear of the linings 900 and 1000 is still small and hence the displacement of the pistons 2 and 3 is small, the angle of turn of the guide gears 12 and 13 is also small and the ratchet teeth 38 of said guide gears 12 and 13 merely slide on the engaged faces of the ratchet teeth 34 of the clutches 14 and 15. When the brakes are taken off and the interior of the cylinder body 1 is depressurized, the brake shoes 200 and 300 are forced back to their original positions under the elastic force of the return spring 800, and also the pistons 2 and 3 return to the initial positions while pressing the elastic members 5 and 6. The guide gears 12 and 13 rotate in the opposite directions and return to the original positions while keeping the ratchet teeth 38 in contact with the corresponding ratchet teeth 34 of the clutches 14 and 15. As the wear of the linings 900 and 1000 increases to cause a corresponding increase of the piston displacement at the time of pressure application, the guide gears 12 and 13 are forced to turn over the crest of the ratchet teeth 34 of the clutches 14 and 15, bringing the ratchet teeth 38 of the guide gears 12 and 13 into engagement with the next new tooth section. When the inside of the cylinder body 1 is depressurized under this condition, the pistons 2 and 3 return to the original positions while rotating since the ratchet teeth 38 of the guide gears 12 and 13 are not allowed to make any sliding movement relative to the ratchet teeth 34 of the clutches 14 and 15 in said new state of engagement. Since the push bolts 7 and 8 tightly hold the webs of the respective shoes 200 and 300 by the clamping means 9 and 10 provided to the respective bolt head portions 43 and cannot rotate, said push bolts 7 and 8 are caused to project out by a pitch corresponding to the amount of rotation of the pistons 2 and 3 to adjust the excess clearance formed between the linings 900 and 1000 and the inner surface of the brake drum 100.

Figure 3:
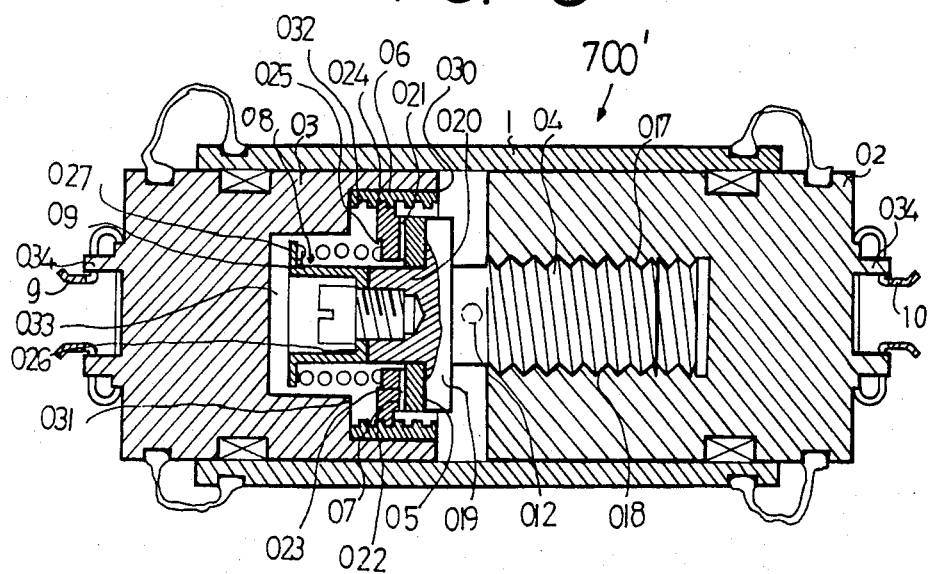
FIG. 3 is a longitudinal sectional view of a wheel cylinder provided with a single automatic clearance adjusting mechanism.

FIG. 3 is a longitudinal sectional view illustrating a practical application of the wheel cylinder 700 shown in FIG. 1, in which a set of automatic clearance adjusting mechanism is provided to the wheel cylinder 700 having two pistions 2 and 3 and designed to adjust the amount of clearance adjustment assigned to each piston. In this embodiment 700', each of the pistons 02 and 03 is not provided with an exposed portion 26 such as formed on the pistons 2 and 3 of FIG. 2 but has a solid bar-shaped portion having the same outer diameter as the slide fit portion 27. One of the pistons 02 has a tapped hole 017 opening to the center of the inside end face and having an effective length greater than ½ of the full length of the piston 02. Engaged into said tapped hole 017 is an adjusting screw 04 which corresponds to the push bolts 7, 8 provided to the pistons 2, 3 shown in FIG. 2. Said adjusting screw 04 has an external threaded portion 018 mating with the internal thread of the tapped hole 017 of the piston 02, a rod-shaped portion provided contiguous to said external threaded portion 018 and having a diameter corresponding to the root diameter of said external threaded portion 018, a circular flanged portion 019 provided contiguous to said rod-shaped portion by enlarging the diameter outwardly, and a fitting portion 020 projecting from said flanged portion 019 and having the same diameter as said rod-shaped portion. The clutch 05 is a ring-shaped body having a rather large thickness. Ratchet teeth 021 are formed on one of the ring faces of said ring-shaped body, and the inner side of the ring is press fit to the fitting portion 020 of said adjusting screw 04 so that the other ring face opposing to the face formed with said ratchet teeth 021 is tightly attached to the corresponding face of the flange portion 019. There is also provided a ring-shaped guide gear 07 having a boss 022. On the ring face of said boss 022 are formed ratchet teeth 023 meshed with the corresponding ratchet teeth 021 of the clutch 05, and helical teeth 024 are formed on the outer surface of the ring. At the ring end face opposing to the boss 022 is provided a female face 025 concentric with the ring face. The guide gear 07 is preferably so designed that the outer diameter of its boss 022 will be smaller than the root diameter of the helical gear 024 and equal to the outer diameter of said clutch 05 and the outer diameter of the flanged portion 019 of the adjusting screw 04. Said guide gear 07 has it ring-shaped circumferential surface lossely fitted to the fitting portion 020 of the adjusting screw 04, and the ratchet teeth 023 on the ring face of the boss 022 is meshed with the corresponding ratchet teeth 021 on the clutch 05 secured to the fitting portion 022. Spring bearing 08, like the spring bearings 16 and 17 shown in FIG. 2, is a cylindrical body having a bottom 026 and a radially extending flanged portion 027 is provided at the open end of said cylindrical body. Said ring bearing 08 is threadedly engaged with the adjusting screw 04 and thereby fixed in position with the outside of the bottom portion 026 being attached to an end face of the fitting portion 020 of said adjusting screw 04. Also, a coil spring 09 is disposed between the backside of the flanged portion 027 and the female face 025 of the guide gear 07 so that said guide gear 07 is held under the pressing force of said coil spring.

The piston 03 forming a pair with the piston 02 in opposed relation to each other is a solid bar and provided with a circular stepped bore 030 opening to an inside end face of the bar, said stepped bore 030 consisting of a large bore 031 and a small bore 033 formed concentric with and contiguous to said large bore 031 and smaller in diameter than the large bore 031. A thick-walled cylindrical fixed guide gear 06 is press fitted into and secured to the inner surface of the large bore 031 forming a part of said circular stepped bore 030. On the interior surface of said fixed guide gear 06 is formed an internal helical gear 032 meshed with the corresponding helical gear 024 on the guide gear 07. The depth of said large bore 031 is equal to the axial length of the fixed guide gear 06 so that said fixed guide gear 06, after being press fitted and secured in position, won't project out from the open end of said large bore 031. Into the small bore 033 is loosely fitted the spring bearing 08 secured to the fitting portion 020 of the adjusting screw 04, providing a relief so as to minimize the full length of the wheel cylinder 700. Said pair of pistons 02 and 03 are so arranged that, in the state where no brake is applied, the helical gear 024 of the guide gear 07 held to the fitting portion 020 of the adjusting screw 04 by the coil spring 09 is kept meshed with the corresponding helical gear 032 of the fixed guide gear 06 at the middle part thereof. They are also so designed that a space is always formed between the open end face of the circular stepped bore 030 of the piston 03 and the inner open end of the tapped hole 017 of the piston 02. Further, each of said pistons 02 and 03 has an outwardly extending circular piston head 034 at the central part of the outside end face, and a clamping means 9 (10) is adapted to said piston head 034.

Now, the operation of the embodiment of automatic clearance adjusting mechanism 700' shown in FIG. 3 is described.

When the pressurized operating fluid is introduced into the cylinder body 1 from the pressure feed hole 012 for applying the brakes, both pistons 02 and 03 receive the pressing force on the inside and are forced out. Accordingly, the fixed guide gear 06 and the guide gear 07 are moved relative to each other along a distance corresponding to the sum of displacements of independently forced-out pistons 02 and 03 while keeping the helical gear 032 in meshed relation with the helical gear 024. When the rotation of the guide gear 07 corresponding to the amount of said movement is still short of passing one pitch of the engaged ratchet gear 023 of the guide gear 07 and the ratchet gear 021 of the clutch 05, there merely takes place sliding on the engaged faces of ratchets, and if the interior of the cylinder body 1 is depressurized under this condition, both pistons 02 and 03 are forced back to the original positions and accordingly the guide gear 07 is turned reversely to retun to the original position of engagement. However, when the amount of wear of the linings 900 and 1000 increases, causing a corresponding increase of the length of relative movement of said fixed guide gear 06 and guide gear 07, and the ratchet gear 021 of the clutch 05 passes one pitch of the engaged ratchet gear 023 of the fixed guide gear 06, they form a new area of engagement. And when the inside of the cylinder body 1 is depressurized under this condition, both pistons 02 and 03 return to the original positions, causing the reverse rotation of the guide gear 07. In this case, however, since no sliding contact is made on the new area of engagement, the clutch 05 is forced to turn in accordance with the rotation of the guide gear 07, causing the corresponding rotation of the adjusting screw 04 secured to said clutch 05. Since the pistons 02 and 03 are inhibited from rotating by the engagement with the respective brake shoes 200 and 300, the adjusting screw 04 and piston 02 produce a positional change in the axial direction corresponding to the angle of rotation to adjust the excess clearance between the linings 900, 1000 and the interior surface of the drum 100. Since both pistons 02 and 03 are not provided with a shoulder abutting to the open end face of the cylinder body 1, they are capable of independently moving in the cylinder body through a distance corresponding to the amount of wear of the respective linings, and thus the amount of adjustment of excess clearance assinged to each piston can be adjusted.

The brake drum having a wheel cylinder adapted with the automatic clearance adjusting mechanism according to this invention can eliminate the necessity of providing a clearance adjusting mechanism comprising a cam mechanism or a link mechanism on the drum backing plate for adjusting the excess clearance between the linings 200, 300 and the interior side of the drum 100, so that the inside of the drum can be made compact to facilitate mounting of other parts. Also, it is made possible to provide a braking device having always a normal braking function, in which the adjustment of any excess clearance can be made for the different amounts of clearance adjustment differing due to the difference in amount of wear between the right and left linings. Further, as the clamping means are adapted to the wheel cylinder to eliminate any play for the rotation, high-precision adjustment is made possible.

What is claimed is:

1. A wheel cylinder having an automatic clearance adjusting mechanism for a drum brake having two pistons arranged to move in axially opposed relation to each other to actuate corresponding shoes of the drum brake, comprising movable guide gears which are rotatable and movable axially with respective ones of said pistons, a fixed guide gear engaged with and adapted to rotatably urge said movable guide gears in response to axial movement of the movable guide gears with the pistons, clutches on said pistons, said clutches contacting respective said guide gears with a mutual pressing force to (1) allow partial rotation of said movable guide gears with respect thereto and (2) require rotation of said pistons with said movable guide gears in one direction when the amount of outward movement of the pistons exceeds a specified value, threaded bars threadedly engaging the respective pistons and responsive to said rotation of said pistons for threaded movement axially in said pistons, and clamping means engaging the corresponding shoe webs and responsive to said threaded relative movement of said pistons and said threaded bar to thereby adjust excess clearance between the shoes and the interior surface of the brake drum.

2. A wheel cylinder having an automatic clearance adjusting mechanism as set forth in claim 1, comprising a cylinder body, said fixed guide gear being secured to a central part of an inner surface of said cylinder body, said fixed guide gear being cylindrical and having an internal helical gear on an inside surface thereof and also provided at its central part with a pressure feed hole in alignment with a similar hole in the cylinder body, said pair of pistons each having an end face with a manual adjusting gear portion of a diameter greater than the outer diameter of the cylinder body, each piston having an exposed portion provided contiguous to said adjusting gear portion and of diameter equal to the outer diameter of the cylinder body, each piston having a slide fit portion provided contiguous to said exposed portion and reduced in diameter stepwise, said slide fit portion being movable slidingly along the inner peripheral surface of the cylinder body, each piston having a fitting portion provided contiguous to said slide fit portion and reduced in diameter stepwise, each piston having a tapped hole opening to the central part of said end face thereof, said clutches being each formed as a thick plate-like ring having ratchet teeth formed on one annular end face thereof, said clutches being secured to the fitting portions of said respective pistons, said guide gears being ring-shaped and each having on one annular end face thereof ratchet teeth meshed with the ratchet teeth of said the corresponding clutch, each guide gear being also provided on its outer peripheral surface with a helical gear engaged with the internal helical gear of said fixed guide gear, spring bearings each being formed as a bottomed cylindrical body having a flange at the open end, the bottom thereof being secured to an end face of the fitting portion of corresponding piston, with a coil spring being disposed between the backside of said flange and the corresponding guide gear to press said guide gear, said threaded bars each having an outside screw-threaded portion threadedly engaged in said tapped hole of said corresponding piston and a head portion formed contiguous to said threaded portion, said head portion having its end cut flat and provided with a rectangular open channel extending transversely to the flat cut end, said clamping means having clamp bodies fitted onto and secured to the cut ends of said respective threaded bars, said clamping means further having snapping lips adapted to join said clamp bodies while holding the shoes, ring-shaped elastic members having a rectangular sectional shape being adapted to the respective pistons and disposed between the stepped end face of the exposed portion of each piston and an open end face of the cylinder body so that a space is provided between the opposing inside end faces of both pistons when they are inserted into the cylinder in an opposed relation to each other.

3. A wheel cylinder having an automatic clearance adjusting mechanism for a drum brake having two pistons arranged to move in axially opposed relation to each other to actuate corresponding shoes of the drum brake, comprising a movable guide gear which is rotatable and movable axially with a respective one of said pistons, a fixed guide gear engaged with and adapted to cause said movable guide gear to rotate in response to relative axial movement of the pistons, a clutch on said one piston, said clutch contacting said guide gear with a mutual pressing force to (1) allow partial rotation of said movable guide gear with respect thereto and (2) require relative rotation of said movable guide gear with respect to said pistons in one direction when the amount of outward movement of the pistons exceeds a specified value, threaded bar threadedly engaging said one piston and responsive to the movement of said pistons for threaded rotational movement axially in said one piston, and clamping means engaging the corresponding shoe webs and responsive to said threaded relative movement of said piston and said threaded bar to thereby adjust excess clearance between the shoes and the interior surface of the brake drum.

4. A wheel cylinder having an automatic clearance adjusting mechanism as set forth in claim 3, comprising a cylinder body having a pressure feed hole formed centrally thereof, said pair of pistons being formed as solid bars, one of said pistons having a tapped hole opening through a central part of an inner end face thereof and a head portion projecting from a central part of an outer end face thereof and designed to anchor one said clamping means, the other piston having at a central part of an inner end face thereof a stepped closed-end bore comprising a larger bore portion and a smaller bore portion concentric with and smaller in diameter than said large bore portion, and a head portion projecting from a central part of an outer end face thereof and designed to anchor another said clamping means, said pistons being disposed in the cylinder body in an opposed relation to each other with a space formed between their opposing inner end faces, an adjusting screw having an external threaded portion threadedly engaged with the tapped hole formed in said one of the pistons, said adjusting screw further having a radially extending circular flanged portion contiguous to said external threaded portion and a fitting portion having a circular sectional shape and projecting from the center of said flanged portion, said movable guide gear being formed as a ring-like member having on one of its annular end faces ratchet teeth meshed with corresponding ratchet teeth on said clutch and also having a helical gear on the outer peripheral face thereof, spring bearings formed as cylindrical bodies having a bottom and an open end, each of said cylindrical spring bearings having at its open end a radially extending flange and having the outer side of its bottom portion secured to an end face of the fitting portion of said adjusting screw, a coil spring being disposed between the backside of said flange and an annular end face of said movable guide gear so as to press said movable guide gear, said fixed guide gear being cylindrical and having on its inner surface an internal helical gear meshed with the helical gear of said movable guide gear and secured to the inner peripheral face of the larger bore portion in said other piston, said clamp means including clamp bodies fitted on the head portions of the respective said pistons, said clamping means further having snapping lips designed to join said clamp bodies to each other while holding the shoe web therebetween.

* * * * *